(12) United States Patent
Kim et al.

(10) Patent No.: US 9,034,987 B2
(45) Date of Patent: May 19, 2015

(54) ADHESIVE FOR POLARIZER PLATE AND METHOD FOR MANUFACTURING THE SAME

(75) Inventors: Seung-Ae Kim, Daejeon Metropolitan (KR); Kyun-Il Rah, Daejeon Metropolitan (KR)

(73) Assignee: LG Chem, Ltd., Seoul (JP)

( * ) Notice: Subject to any disclaimer, the term of this patent is extended or adjusted under 35 U.S.C. 154(b) by 616 days.

(21) Appl. No.: 11/885,741

(22) PCT Filed: Jan. 26, 2007

(86) PCT No.: PCT/KR2007/000481
§ 371 (c)(1),
(2), (4) Date: Sep. 6, 2007

(87) PCT Pub. No.: WO2007/086709
PCT Pub. Date: Aug. 2, 2007

(65) Prior Publication Data
US 2008/0278810 A1   Nov. 13, 2008

(30) Foreign Application Priority Data

Jan. 27, 2006  (KR) .................. 10-2006-0009111

(51) Int. Cl.
| | | |
|---|---|---|
| *C08F 8/00* | (2006.01) | |
| *C08G 63/91* | (2006.01) | |
| *C09J 129/04* | (2006.01) | |
| *C08K 3/28* | (2006.01) | |
| *C08K 5/00* | (2006.01) | |
| *C08K 5/17* | (2006.01) | |
| *G02B 5/30* | (2006.01) | |

(52) U.S. Cl.
CPC ............. *C09J 129/04* (2013.01); *C08K 3/28* (2013.01); *C08K 5/0091* (2013.01); *C08K 5/17* (2013.01); *G02B 5/305* (2013.01)

(58) Field of Classification Search
USPC .................. 525/56, 61; 524/557; 359/485.01
See application file for complete search history.

(56) References Cited

U.S. PATENT DOCUMENTS

| | | | | |
|---|---|---|---|---|
| 4,350,788 | A | * | 9/1982 | Shimokawa et al. ......... 524/309 |
| 5,698,363 | A | * | 12/1997 | Katsuda et al. ............... 430/200 |
| 6,069,203 | A | | 5/2000 | Henry et al. |
| 6,346,570 | B1 | * | 2/2002 | Kazuyuki et al. ............. 524/783 |
| 2006/0033993 | A1 | * | 2/2006 | Sugino et al. ................. 359/487 |
| 2006/0083870 | A1 | * | 4/2006 | Chen ......................... 428/32.34 |
| 2007/0128349 | A1 | | 6/2007 | Miyachi |

FOREIGN PATENT DOCUMENTS

| | | | | |
|---|---|---|---|---|
| JP | 3-221575 | | 9/1991 | |
| JP | 7-198945 | | 8/1995 | |
| JP | 09003797 | A * | 1/1997 | ............ D21H 19/60 |
| JP | 11-116925 | | 4/1999 | |
| JP | 2001-121815 | | 5/2001 | |
| JP | 2004-151130 | | 5/2004 | |
| JP | 2004-334168 | | 11/2004 | |
| JP | 2005-010760 | | 1/2005 | |
| JP | 2005-173440 | | 6/2005 | |
| WO | WO 2004/104655 A1 | | 12/2004 | |
| WO | WO 2005/063910 A1 | | 7/2005 | |
| WO | WO 2005/075211 | | 8/2005 | |

\* cited by examiner

*Primary Examiner* — David W Wu
*Assistant Examiner* — Marie Reddick
(74) *Attorney, Agent, or Firm* — McKenna Long & Aldridge, LLP

(57) ABSTRACT

Disclosed is an adhesive for a polarizing plate that comprises a polyvinyl alcohol-based resin with an acetoacetyl group and an amine-based metal compound crosslinking agent, and a method of manufacturing the same.

5 Claims, No Drawings

ADHESIVE FOR POLARIZER PLATE AND METHOD FOR MANUFACTURING THE SAME

TECHNICAL FIELD

The present invention relates to an adhesive for a polarizing plate that has a predetermined adhesion property and no stain, and a method of manufacturing the same.

This application claims priority from Korean Patent Application No. 10-2006-0009111 filed on Jan. 27, 2006 in the Korean Intellectual Property Office, the disclosure of which is incorporated herein by reference in its entirety.

BACKGROUND ART

A polarizing plate that is applied to various types of image display devices such as liquid crystal display devices, plasma display devices, and electroluminescences has a structure that includes a polarizer formed of a polyvinyl alcohol-based film and a transparent protective film formed on at least one side of the polarizer. In connection with this, examples of an adhesive for a polarizing plate that is used to attach the polarizer and the transparent protective film to each other include a water-based adhesive. In particular, a polyvinyl alcohol-based adhesive in which a crosslinking agent is mixed with a polyvinyl alcohol aqueous solution is used.

Currently, the high-quality image display device is required. The high-quality image display device has a slim and light structure, uniformity, heat resistance, moisture resistance, and a waterproofing property, thereby ensuring high precision and high performance. Accordingly, it is required that the adhesive that is applied to the image display device has the moisture resistance and the waterproofing property and delaminating is prevented in a humid atmosphere.

To satisfy the requirement, JP-A-7-198945 discloses an adhesive for a polarizing plate that includes a polyvinyl alcohol-based resin with an acetoacetyl group and a crosslinking agent.

However, the adhesive for the polarizing plate is problematic in that a stain is generated in the alkali pH condition, storage stability (pot life) of the adhesive is short, the moisture resistance and the waterproofing property are poor, and yellowing occurs to change the color of the polarizing plate when a heat resistance evaluation is performed in the acidic pH condition.

DISCLOSURE

Technical Problem

It is an object of the present invention to provide an adhesive for a polarizing plate that has a predetermined adhesion property and no stain, and a method of manufacturing the same.

Technical Solution

In order to accomplish the above object, according to an embodiment of the present invention, an adhesive for a polarizing plate comprises a polyvinyl alcohol-based resin with an acetoacetyl group, and an amine-based metal compound crosslinking agent.

According to another embodiment of the present invention, a method of manufacturing an adhesive for a polarizing plate comprises making an adhesive aqueous solution by mixing a polyvinyl alcohol-based resin with an acetoacetyl group and an amine-based metal compound crosslinking agent.

According to still another embodiment of the present invention, a polarizer comprises an adhesive layer that is formed of the adhesive for a polarizing plate of the present invention on at least one side thereof.

According to yet another embodiment of the present invention, a polarizing plate comprises a polarizer, a transparent protective film, and an adhesive layer, that is formed of the adhesive for a polarizing plate of the present invention, interposed between the polarizer and the transparent protective film.

According to a further embodiment of the present invention, a display device comprises the polarizing plate of the present invention.

The present invention will be described in detail hereinafter.

According to an embodiment of the present invention, an adhesive for a polarizing plate comprises a polyvinyl alcohol-based resin with an acetoacetyl group and an amine-based metal compound crosslinking agent.

The adhesive for the polarizing plate may comprise 100 parts by weight of the polyvinyl alcohol-based resin with the acetoacetyl group and 1 to 50 parts by weight of the amine-based metal compound crosslinking agent.

The polyvinyl alcohol-based resin is not limited as long as the resin is capable of desirably attaching the polarizer and the transparent protective film to each other, and has excellent optical penetration and no consecutive change such as yellowing. In consideration of the desirable crosslinking reaction to the amine-based metal compound crosslinking agent, it is preferable to use the polyvinyl alcohol-based resin with the acetoacetyl group.

The degree of polymerization and saponification of the polyvinyl alcohol-based resin are not limited as long as the polyvinyl alcohol-based resin contains the acetoacetyl group, but it is preferable that the degree of polymerization be 200 to 4,000 and the degree of saponification be 70 to 99.9 mol %. In consideration of the desirable mixing to the contained material according to the free movement of molecules, it is more preferable that the degree of polymerization is 1,500 to 2,500 and the degree of saponification is 90 to 99.9 mol %. In connection with this, it is preferable that the polyvinyl alcohol-based resin contain 0.1 to 30 mol % of the acetoacetyl group. In the above-mentioned range, the reaction to the amine-based metal compound crosslinking agent may be desirably performed and the adhesive may have the desired waterproofing property.

The amine-based metal compound crosslinking agent is a water-soluble crosslinking agent that contains a functional group having a predetermined reactivity to the polyvinyl alcohol-based resin, and preferably, a metal complex comprising an amine-based ligand. Examples of metal that is capable of being applied to the metal complex comprise a transition metal such as zirconium (Zr), titanium (Ti), hafnium (Hf), tungsten (W), iron (Fe), cobalt (Co), nickel (Ni), ruthenium (Ru), osmium (Os), rhodium (Rh), iridium (Ir), palladium (Pd), and platinum (Pt). Examples of the ligand that is coupled with the central metal may comprise any ligand as long as the ligand contains at least one amine group such as primary amines, secondary amines (diamines), tertiary amines, or ammonium hydroxides. It is preferable that the amount of the crosslinking agent be 1 to 50 parts by weight based on 100 parts by weight of the polyvinyl alcohol-based resin. In the above-mentioned range, it is possible to provide significant adhesion strength to the target adhesive and to improve the storage stability (pot life) of the adhesive.

The adhesive for the polarizing plate is an aqueous solution that comprises the polyvinyl alcohol-based resin with the acetoacetyl group and the amine-based metal compound crosslinking agent, and the pH of the aqueous solution may be 9 or less. In the case of when the pH of the aqueous solution is controlled to 9 or less, the adhesive for the polarizing plate having the excellent storage stability may be provided. Furthermore, in the case of when the adhesive for the polarizing plate according to the present invention is applied to the polarizing plate for display devices, the adhesion property and the waterproofing property are acceptable between elements, the delaminating does not occur even in the highly humid atmosphere, and the stain is not generated.

It is preferable that the pH of the adhesive aqueous solution comprising the polyvinyl alcohol-based resin with the acetoacetyl group and the amine-based metal compound crosslinking agent be controlled to 9 or less using a pH controlling agent. More preferably, the pH may be controlled to more than 2 and 9 or less, and most preferably, 4 to 8.5.

In connection with this, if the pH is controlled to more than 2 and 9 or less, the avoidance of the stain may be improved and the improved waterproofing property may be provided. In the case of when the polarizing plate is manufactured so that the pH of the adhesive aqueous solution is set to 2 or less, the polarizing plate that has no stain and the excellent adhesion strength may be provided. However, in the case of when the polarizing plate is left at high temperatures for a long time, the yellowing may occur on the polarizing plate to redden the polarizing plate. Thus, the polarizing plate is difficult to perform its duty.

The controlling of the pH may be performed by providing an acid to the aqueous solution. In connection with this, the pH controlling agent may be either of a strong acid and a weak acid. For example, the pH controlling agent may be one or more acid selected from the group consisting of nitric acid, hydrochloric acid, sulfuric acid, and acetic acid. If the pH of the adhesive aqueous solution is 9 or less, the adhesive aqueous solution may be mixed with various types of coupling agents, viscosity providing agents, ultraviolet ray absorption agents, anti-oxidizing agents, and stabilizers.

The adhesive for the polarizing plate according to the present invention may be usefully applied to adhesive layers of high-quality polarizers, polarizing plates, and display devices.

In detail, the adhesive for the polarizing plate according to the present invention may be used to attach the polarizer and the transparent protective film to each other.

In connection with this, the transparent protective film may be a film that is made of one or more selected from the group consisting of polyethylene terephthalate, polyethylene naphthalate, triacetyl cellulose, polymethylmethacrylate, acrylonitrile-styrene copolymer, polycarbonate, and cycloolefin.

According to another embodiment of the present invention, a method of manufacturing the adhesive for the polarizing plate comprises mixing the polyvinyl alcohol-based resin with the acetoacetyl group and the amine-based metal compound crosslinking agent to make the adhesive aqueous solution. All the constituent elements of the former embodiment are applied to the present embodiment.

In the step of making the adhesive aqueous solution, 100 parts by weight of the polyvinyl alcohol-based resin with the acetoacetyl group and 1 to 50 parts by weight of the amine-based metal compound crosslinking agent may be mixed with each other to manufacture the adhesive aqueous solution.

The method of manufacturing the adhesive for the polarizing plate according to the present invention may further comprise controlling the pH of the adhesive aqueous solution to 9 or less using the pH controlling agent.

The pH controlling agent may be one or more acid selected from the group consisting of nitric acid, hydrochloric acid, sulfuric acid, and acetic acid.

According to still another embodiment of the present invention, a polarizer may further comprise an adhesive layer that is formed on at least one side thereof using the adhesive for the polarizing plate according to the present invention.

In the polarizer in which a release film is detachably formed, the adhesive layer may be formed on at least one side of the polarizer using the adhesive for the polarizing plate according to the present invention.

According to yet another embodiment of the present invention, the polarizing plate may comprise the polarizer, the transparent protective film, and the adhesive layer that is interposed between the polarizer and the transparent protective film and formed using the adhesive for the polarizing plate according to the present invention. In connection with this, the polarizing plate may be manufactured by attaching the polarizer and the transparent protective film to each other using the adhesive for the polarizing plate according to the present invention.

The polarizer may be manufactured using a material typically used in the related art. For example, the polarizer may be a polyvinyl alcohol-based film or an ethylene-vinyl acetate copolymer-based film.

The transparent protective film is not limited as long as the transparent protective film has excellent transparency property, mechanical strength, thermal stability, and water-blocking property required as a transparent polymer of film. For example, the transparent protective film may be a film that is made of one or more selected from the group consisting of polyethylene terephthalate, polyethylene naphthalate, triacetyl cellulose, polymethylmethacrylate, acrylonitrile-styrene copolymer, polycarbonate, and cycloolefin.

According to a further embodiment of the present invention, a display device may comprise the polarizing plate according to the present invention.

Examples of the display device comprise, but are not limited to, a liquid crystal display (LCD) device, an electroluminescence (EL) device, and a plasma display (PDP) device.

Advantageous Effects

An adhesive for a polarizing plate according to the present invention is advantageous in that storage stability is excellent, an adhesion property and a waterproofing property are acceptable between elements when the adhesive for the polarizing plate is applied to a polarizing plate for image display devices such as to liquid crystal display devices, electroluminescence devices, and plasma display devices, delaminating does not occur even in the highly humid atmosphere, yellowing due to internal heat does not occur, and a stain is not generated.

MODE FOR INVENTION

Hereinafter, the present invention will be described in detail with reference to Examples. A better understanding of the present invention may be obtained in light of the following examples which are set forth to illustrate, but are not to be construed to limit the present invention.

Example 1

(a) Manufacturing of the Polarizing Film (Polarizer)

The polyvinyl alcohol film having a thickness of 75 μm was immersed in a dyeing solution of iodine and potassium iodide to be dyed while moved using the guide rolls, and then stretched to 3 to 5 times the original length thereof. Subsequently, the film was added to a bath comprising boric acid and potassium iodide, subjected to crosslinking treatment, and dried at 80° C. for 5 to 8 min to manufacture the polarizing film.

(b) Manufacturing of the Adhesive

Polyvinyl alcohol (the degree of average polymerization of 2000 and the degree of saponification of 94%) that contained the acetoacetyl group (5%) was dissolved in pure water to produce 3.8% aqueous solution.

The zirconium amine compound (commercial name—AC-7, manufactured by Daichi Kigenso Kagaku Kogyo, Co.) was dissolved in pure water to produce 3.8% aqueous solution. The zirconium amine compound aqueous solution was added to the polyvinyl alcohol aqueous solution so that the content of the zirconium amine compound aqueous solution is 20 parts by weight based on 100 parts by weight of the polyvinyl alcohol, and the mixing was performed along with the agitation. 1M hydrochloric acid aqueous solution was added to the resulting mixture solution so that the pH was controlled to 8.5 to manufacture the adhesive.

(c) Manufacturing of the Polarizing Plate

The triacetyl cellulose (TAC) film having the thickness of 80 μm which was subjected to the saponification and acted as a protection film was attached to both sides of the polyvinyl alcohol-based polarizing film using the above-mentioned adhesive, subjected to the lamination, and dried to manufacture the polarizing plate.

Example 2

The polarizing plate was manufactured using the same process as Example 1, except that the pH of the mixture solution of the adhesive composition of Example 1 was controlled to 4 using 1M hydrochloric acid.

Example 3

The polarizing plate was manufactured using the same process as Example 1, except that the titanium amine complex (commercial name—TYZOR TE, manufactured by Dupont, Co.) was used as the crosslinking agent of the adhesive composition of Example 1.

Example 4

The adhesive composition which was the same as that of Example 1 was used, and the polarizing plate was manufactured using the following process.

The triacetyl cellulose film that had the thickness of 80 μm and was subjected to the saponification treatment was attached to a side of the polyalcohol-based polarizing film, and the cycloolefin film (the zeonor film manufactured by Zeon, Co., Ltd.) that had the thickness of 50 μm and was subjected to the corona treatment was attached to another side, the lamination was performed, and the drying was performed. The acrylate-based adhesive was applied to the triacetyl cellulose film side to evaluate the waterproofing property.

Comparative Example 1

The polarizing plate was manufactured using the same process as Example 1, except that the pH of the adhesive composition was not controlled using hydrochloric acid.

Comparative Example 2

The polarizing plate was manufactured using the same process as Example 3, except that the pH of the adhesive composition was not controlled using hydrochloric acid.

Comparative Example 3

The polarizing plate was manufactured using the same process as Comparative example 1, except that ethylene diamine was used as the crosslinking agent of the adhesive composition of Comparative example 1.

Comparative Example 4

The polarizing plate was manufactured using the same process as Example 1, except that the crosslinking agent was not used but only the polyvinyl alcohol aqueous solution of Example 1 was used in the adhesive composition.

Experimental Example

Evaluation of the stain, the storage stability (pot life), and the waterproofing property <Evaluation of the Stain>

The polarizing plates that were manufactured according to Examples 1 to 4 and Comparative examples 1 to 4 were cut to sizes of 120×120 mm$^2$. The two polarizing plates overlapped so that the stretching directions of the polarizing films were perpendicular to each other. Subsequently, the orthogonally disposed polarizing plates were provided on the backlight that was applied to the LCD panel, and the generation of the stain was evaluated.

<Evaluation of the Storage Stability—the Pot Life>

After the adhesive was prepared, the agitation was performed for 10 min, and the time that was required to gelate 50 mL of adhesive provided in the vial having the volume of 100 mL was measured. The gellation where the adhesive expanded like the thread was confirmed with the unaided eye. The longer the pot life is, the better the adhesive is. In order to easily perform the process, it is required that the time is 24 hr or more, and preferably 3 days or more.

<Evaluation of the Waterproofing Property>

Like the evaluation of the stain, after the polarizing plate was manufactured, the acrylate-based adhesive was applied on a side of the triacetyl cellulose (TAC) film of the polarizing plate. The resulting polarizing plate was cut to sizes of 50×80 mm$^2$. In connection with this, the stretching direction of the polarizing film was set the long axis and the direction that was perpendicular to the long axis was set the short axis. After the polarizing plate was layered on glass using the applied adhesive, the waterproofing property was evaluated by observing the delaminating when the polarizing plate layered on glass was left at the temperature of 60° C. and the relative humidity of 100% (using a thermostat) for 8 hours. The amount of species removed from an end of the polarizing plate was measured, and the ratio of the amount to the size of the sample was ensured to evaluate the delaminating. The lower the delaminating is, the better the adhesive is.

The results are described in the following Table 1.

TABLE 1

| Section | Composition of adhesive | Stain | Storage stability (pot life) | Evaluation of waterproofing property <delaminating %> |
|---|---|---|---|---|
| Example 1 | PVA 100 parts by weight/ AC-7 20 parts by weight 1M hydrochloric acid added (pH 8.5) | No stain | 7 days or more | 1 |
| Example 2 | PVA 100 parts by weight/ AC-7 20 parts by weight 1M hydrochloric acid added (pH 4) | No stain | 7 days or more | 1 |
| Example 3 | PVA 100 parts by weight/ TE 20 parts by weight 1M hydrochloric acid added (pH 8.5) | No stain | 7 days or more | 2 |
| Example 4 | PVA 100 parts by weight/ AC-7 20 parts by weight 1M hydrochloric acid added (pH 8.5) | No stain | 7 days or more | 1 |
| Comparative example 1 | PVA 100 parts by weight/ AC-7 20 parts by weight | Stain | 7 days or more | 1 |
| Comparative example 2 | PVA 100 parts by weight/ TE 20 parts by weight | Stain | 7 days or more | 2 |
| Comparative example 3 | PVA 100 parts by weight/ EDA 20 parts by weight | Significant stain | 1 HR | 3 |
| Comparative example 4 | Only PVA | No stain | 7 days or more | 100 |

In the case of Comparative example 1, there was a problem in that the storage stability (pot life) was high but the adhesive had the turbid color after 3 days. In the case of Comparative example 2, there was a problem in that the storage stability (pot life) was high but the yellowing occurred to yellow the adhesive after 1 day.

As shown in Table 1, the polarizing plates of Examples 1 to 4 did not have the stain, and had the delaminating of about 2% when the polarizing plates were left for 8 hours to evaluate the waterproofing property, thus being evaluated to have the excellent waterproofing property.

However, in Comparative examples 1 to 3, the stain was generated in the stretching direction of the polarizing film in the polarizing plate. In the waterproofing property evaluation, the delaminating was 3%, which meant that the delaminating was acceptable.

In Comparative example 4, the storage stability (pot life) was high and the stain was not generated. However, in the waterproofing property evaluation, the delaminating was 100%, which meant that the total delaminating occurred.

The invention claimed is:

1. An adhesive for a polarizing plate comprising:
a polyvinyl alcohol-based resin with an acetoacetyl group which comprises 0.1 to 30 mol % of the acetoacetyl group; and
an amine-based metal compound crosslinking agent,
wherein the adhesive is an aqueous solution with a pH of more than 2 and 9 or less,
wherein the amine-based metal compound crosslinking agent is a metal complex comprising an amine-based ligand, and
wherein the metal complex comprises titanium (Ti), and one or more amine groups selected from the group consisting of primary amine, secondary amine, and tertiary amine as the ligand.

2. The adhesive for a polarizing plate according to claim 1, wherein the adhesive comprises 100 parts by weight of the polyvinyl alcohol-based resin with the acetoacetyl group and 1 to 50 parts by weight of the amine-based metal compound crosslinking agent.

3. The adhesive for a polarizing plate according to claim 1, wherein the pH of the aqueous solution is controlled using one or more acids selected from the group consisting of nitric acid, hydrochloric acid, sulfuric acid, and acetic acid.

4. The adhesive for a polarizing plate according to claim 1, wherein the adhesive is used to attach a polarizer and a transparent protective film to each other.

5. The adhesive for a polarizing plate according to claim 4, wherein the transparent protective film is a film that is made of one or more selected from the group consisting of polyethylene terephthalate, polyethylene naphthalate, triacetyl cellulose, polymethylmethacrylate, acrylonitrile-styrene copolymer, polycarbonate, and cycloolefin.

* * * * *